May 18, 1965 F. O. LUENBERGER 3,184,626
EDDY CURRENT CLUTCH AND POWER SUPPLY THEREFOR
Filed Jan. 9, 1961 4 Sheets-Sheet 2

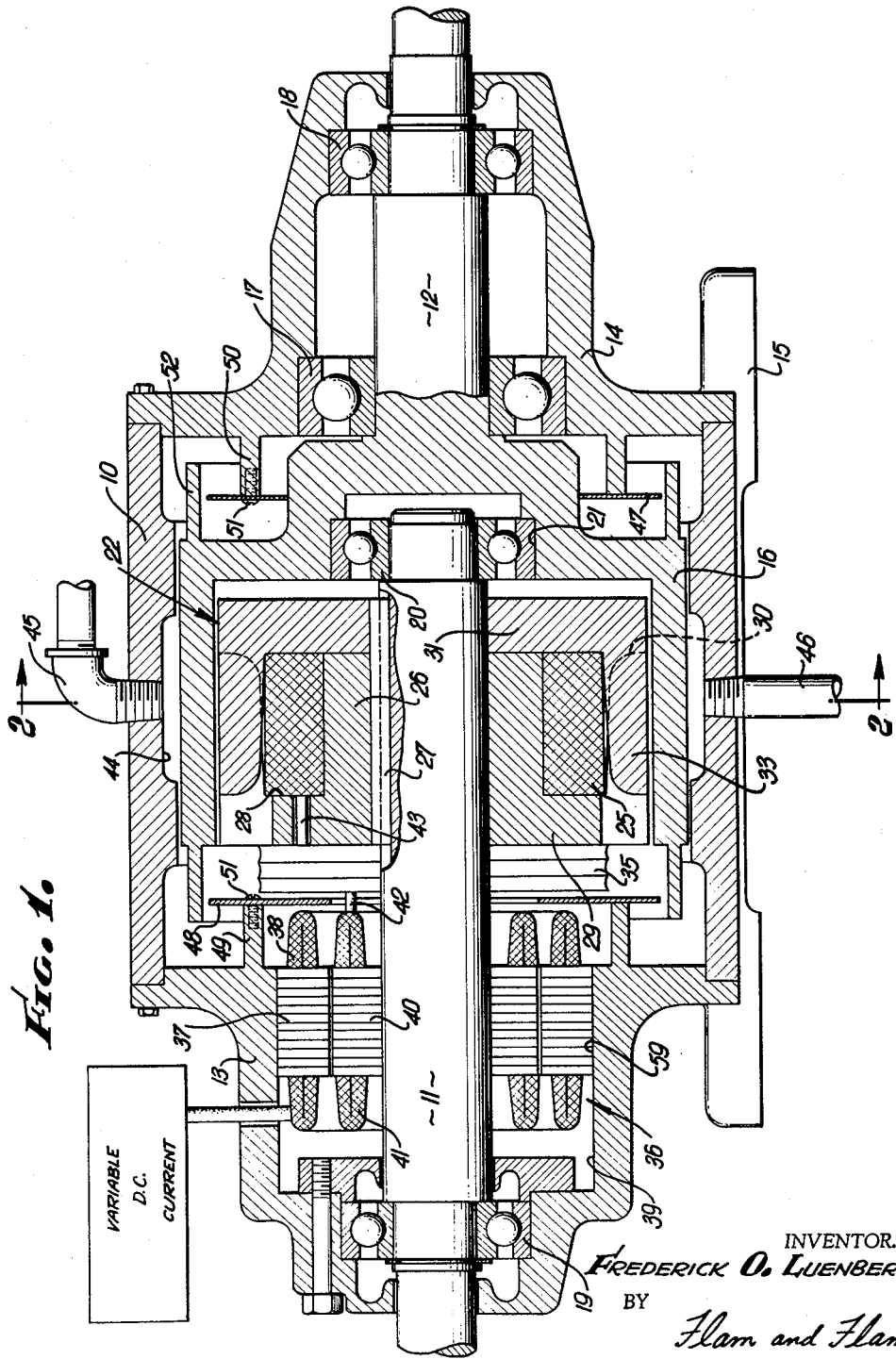

INVENTOR.
FREDERICK O. LUENBERGER
BY Flam and Flam
ATTORNEYS.

May 18, 1965  F. O. LUENBERGER  3,184,626
EDDY CURRENT CLUTCH AND POWER SUPPLY THEREFOR
Filed Jan. 9, 1961  4 Sheets-Sheet 3

INVENTOR.
FREDERICK O. LUENBERGER
BY
Flam and Flam
ATTORNEYS.

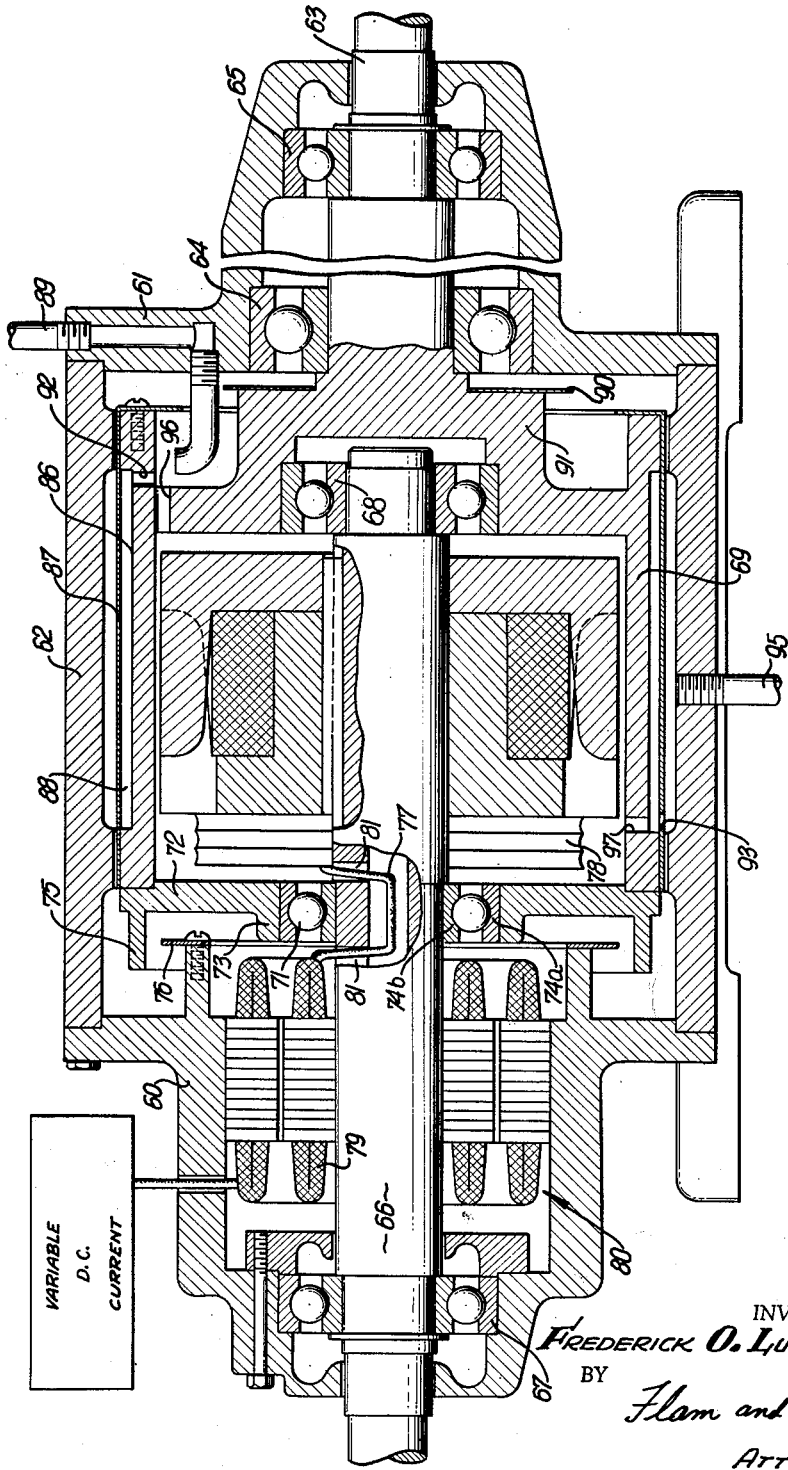

United States Patent Office 3,184,626
Patented May 18, 1965

3,184,626
EDDY CURRENT CLUTCH AND POWER SUPPLY THEREFOR
Frederick O. Luenberger, Los Angeles, Calif., assignor, by mesne assignments, to Emerson Electric Co., a corporation of Missouri
Filed Jan. 9, 1961, Ser. No. 81,459
2 Claims. (Cl. 310—96)

This invention relates to an eddy current clutch and power supply therefor.

In a typical eddy current clutch, a drum or shell in which eddy currents are induced is carried by one shaft, and a winding for inducing a direct current field for inducing eddy currents in the drum or shell is carried for rotation with another shaft. Either shaft may be then used as the input shaft but usually that which carries the direct current winding. Upon the existence of any relative rotation between the shafts, eddy currents are induced in accordance with the difference in speed. A magnetic coupling results from the interaction of the eddy current field and the D.C. field, and the driven shaft is rotated. The existence of torque depends, however, upon some rotation of the input shaft. The eddy current clutch, then, is not immediately responsive. Customarily, slip rings make the D.C. field coil accessible to an external, adjustable source whereby the degree of coupling of the clutch can be controlled.

An object of the present invention is to make possible an improved eddy current clutch structure in which the use of slip rings is avoided.

Another object of this invention is to provide a new eddy current clutch in which a coupling is effective without any differential speed relationship between the shafts. Accordingly, a starting torque of finite value is provided.

Another object of this invention is to provide an improved eddy current clutch that incorporates effective and efficient water or other fluid cooling means for dissipating the heat generated.

Still another object of this invention is to provide an improved eddy current clutch in which the cage or drum can be made as long as necessary, for appropriate design purposes, by the unique location of electrical and mechanical components.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is an axial sectional view of an eddy current clutch incorporating the present invention;

FIG. 4 is an axial sectional view similar to FIG. 1 but illustrating another modified form of the present invention.

Figure 1A:
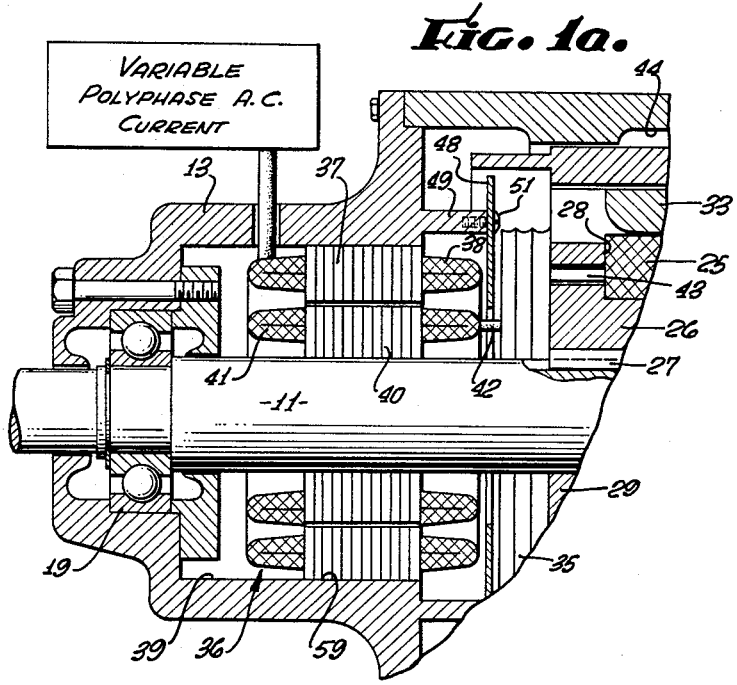
FIG. 1a is a fragmentary axial sectional view of a modified form of the present invention.

In FIG. 1 there is illustrated a generally cylindrical housing 10 from opposite ends of which an input and an output shaft 11 and 12 project. Bell-shaped end brackets 13 and 14 are attached to opposite ends of the housing 10 for supporting the shafts 11 and 12. A base 15 secured to the lower side of the housing 10 provides a preferred means for mounting the structure upon a support.

The output shaft 12 preferably has integrally formed at its inner end, a cup-like shell or drum 16 made of electrically conductive and magnetic material in which eddy currents may be induced. The drum has slight clearance with the inner surface of the housing 10, in which it is longitudinally centered. The drum opens in a direction facing the input shaft 11 so that it may receive the D.C. field structure carried by the input shaft. The shaft 12 at the base of the drum is supported by two bearings 17 and 18 in turn mounted in spaced relationship by the bracket 14.

The input shaft 11 is supported by two bearings. One of the bearings 19 is carried by the end bracket 13. The other bearing 20 is supported in a recess 21 in the bottom of the drum 16.

Figure 2:
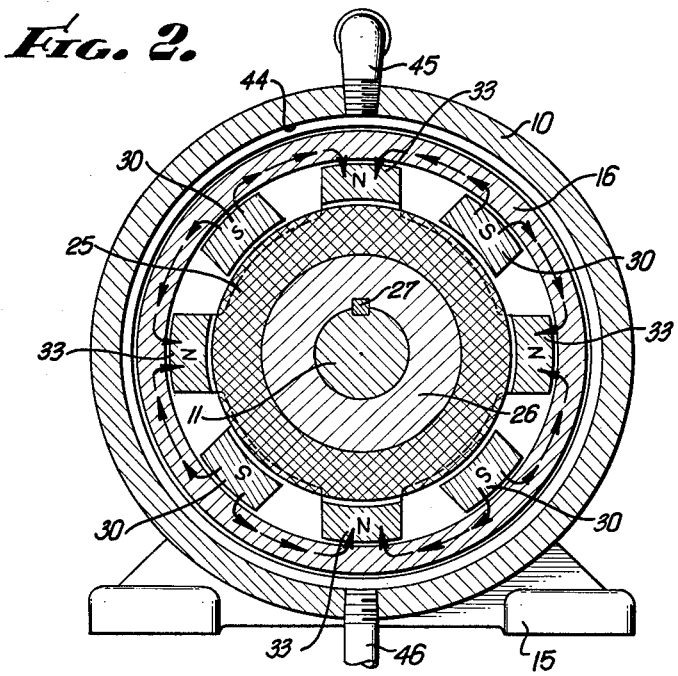
FIG. 2 is a transverse sectional view of the clutch and taken along a plane indicated by line 2—2 of FIG. 1.
Figure 3:
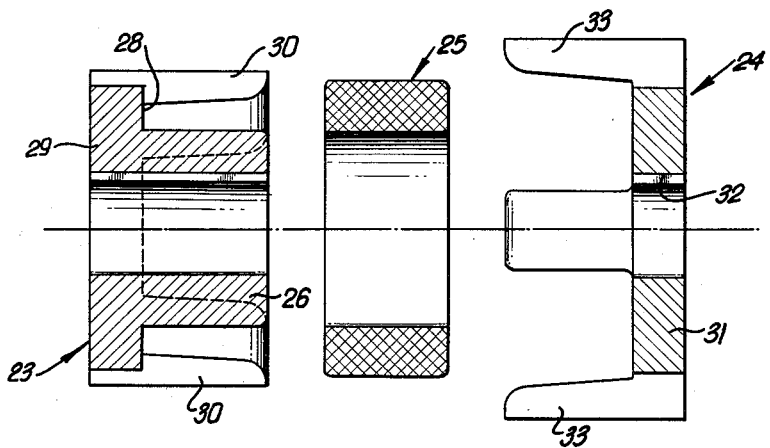
FIG. 3 is an exploded view showing the core parts and the coil forming the field structure of the clutch.

A D.C. field structure is carried at the inner end of the input shaft and is accommodated within the drum 16. The field structure 22, as best shown in FIGS. 2 and 3, comprises two core parts 23 and 24 of magnetic material, such as iron, and a cylindrically wound field coil 25. The core part 23 has a generally cylindrical hub 26 fitting the input shaft 11 and coupled thereto by a key 27 (FIGS. 1 and 2). The coil 25 fits over the hub 26 and abuts a circular or radial wall or flange 28 at one end of the hub 26.

Projecting in an axial direction from the wall 28 and back over the hub 26 and coil 25, are a series of angularly spaced pole pieces 30; in this instance, four.

The core part 24 includes a circular wall accommodated on the shaft 11, there being a key recess 32 also engaged by the key 27. One side of the wall 31 is clamped against the end of the hub 26 by suitable means (not shown).

The part 24 also has a series of pole pieces 33 projecting in an axial direction over the coil 25 and in interleaving but spaced relationship with the poles 30 as shown in FIG. 2. Upon excitation of the coil 25 by direct current, the poles of the part 23 and the poles of the part 24 will be of opposite polarity.

Alternately, North and South poles are presented to the drum within the inner surface thereof. The magnetic circuit between the poles 30 and 33 is completed between adjacent poles via the air gaps at the inside of the drum and the drum proper. The path completion is indicated by the arrows 34 in FIG. 2.

In order to supply the coil 25 with direct current, a rectifier structure 35 is provided that is affixed to the outer side of the core part wall 29 for rotation therewith. The rectifier is fed from a generator 36 that is accommodated within the end bracket 13.

The generator 36 includes a stator core 37 together with windings 38 affixed to the cylindrical interior surface 59 of the end bracket 13 and a rotor core 40 together with windings 41 carried by the input shaft 11. The rotor winding 41 supplies the rectifier 35 via a cable 42, and the rectifier 35 in turn supplies the D.C. coil 25 via a cable 43. By passing energy through the air gap of the generator, the use of slip rings is avoided.

The stator winding 38 may be excited from any suitable source preferably adjustable to vary the degree of excitation. The winding 38 may, for example, be excited from an external D.C. source, in which case the windings 38 are arrayed as windings of a D.C. generator. In this instance, the windings 41 of the rotor may be arrayed as a polyphase wound rotor. Induced currents then tend to increase as speed increases, and the coupling becomes stronger at higher speeds. If a constant excitation of the field 25 is desired, for example, excitation of the stator windings 38 must be reduced, automatically or otherwise, as speed increases.

The form shown in FIG. 1a is the same as FIG. 1 except that the stator windings 38 are arrayed in phase groups for excitation by a variable polyphase A.C. source. In this instance, the field created by the stator rotates in space, and thus with respect to the rotor even when the rotor is at standstill. Accordingly, at standstill current is generated in the rotor winding 40, and current is produced in the field coil 25, effecting a coupling between the input and output shafts.

The stator winding 38 can be wound so that the motion of the shaft 11 adds to the apparent speed of the stator field, or so that it subtracts from the apparent speed of the stator field. In the former case, the induced currents will tend to increase with speed; in the latter case, the induced currents will tend to decrease with speed, at least until the speed corresponds to the speed of the stator field.

If a decreased excitation is desired or permissible, the differential relationship of the rotor field is most advantageous since external compensation will then not be required. As an example, the designed maximum speed of the shaft 11 may be half the synchronous speed of the rotating field produced by the stator 38. When full shaft speed is reached, the strength of the field within the eddy current drum reduces by 50% as compared to standstill.

Since a great deal of heat is generated in the eddy current clutch, water cooling is desired. For this purpose, the shell 10 has an annular interior recess 44 that is opposed to the central area of the eddy current drum 16. Cooling water is applied through a fitting 45 in the top of the housing 10 to the recess 44. The water is withdrawn via a conduit 46 located at the lower portion of the housing 10.

Due to centrifugal forces, the water tends to be thrown outwardly away from the rectifier 35 and the generator 36. As additional protection, splash guards 47 and 48 are provided.

These splash guards 47 and 48 are in the form of apertured discs, respectively mounted on inwardly directed cylindrical flanges 49 and 50 of the end brackets 13 and 14 by screws 51. The brackets 13 and 14 are slightly smaller in diameter than the discs.

The flange 49 extends in exterior encompassing relationship to the end turns of the stator and rotor windings 38 and 41 and slightly within the drum 16. The disc 48 has an outside diameter that closely approaches the inner surface of the drum. Access of water to the rectifier 35, generator 36, field 22, bearings 19 and 21 depends upon the slight clearance space between the disc 48 and the drum 16. Protection is thus obtained.

The base end of the cup forming the eddy current shell 16 has a flange 52 that similarly cooperates with the splash guard 47 to define a slight clearance space that separates bearings 17 and 18 from the exterior of the drum 16.

In the form illustrated in FIG. 4, end brackets 60 and 61, as before, cooperate with a housing 62 of generally cylindrical form to provide an enclosure for the eddy current clutch. A driven shaft 63 projects into, and is supported by, the end bracket 61, bearings 64 and 65 being provided for that purpose. The driving shaft 66 is supported in the end bracket 60 by a bearing 67. The inner end of the driving shaft is piloted by a bearing 68 mounted at the bottom of the eddy current drum 69.

In the present example, the end of the eddy current drum 69 that receives the driving shaft 66 is additionally supported by a bearing 71. A bracket plate 72 at the opening of the drum has an apertured hub 73 receiving the outer race 74a of the bearing 71. The inner race 74b is mounted on the input shaft 66.

By virtue of the provision of the second bearing 71, the load on the bearings 64 and 65 can be largely relieved, which is especially important if the eddy current drum 69 is long.

The plate 72 provides a flange 75 overlying the splash guard disc 76. A cable 77 connects the rotary rectifier 78 and the rotor winding 79 of a generator 80. The cable 77 passes through lateral cavities 81 of the shaft 66 in order to connect the rectifier 78 and rotor winding 79 which are located on opposite sides of the bearing 71. The cable 77 so oriented clears structure that rotates relative to the shaft 66.

The generator 80 is similar to that described in the previous forms. Either D.C. or A.C. excitation may be provided as indicated in FIGS. 4 and 4a respectively.

Figure 4A:
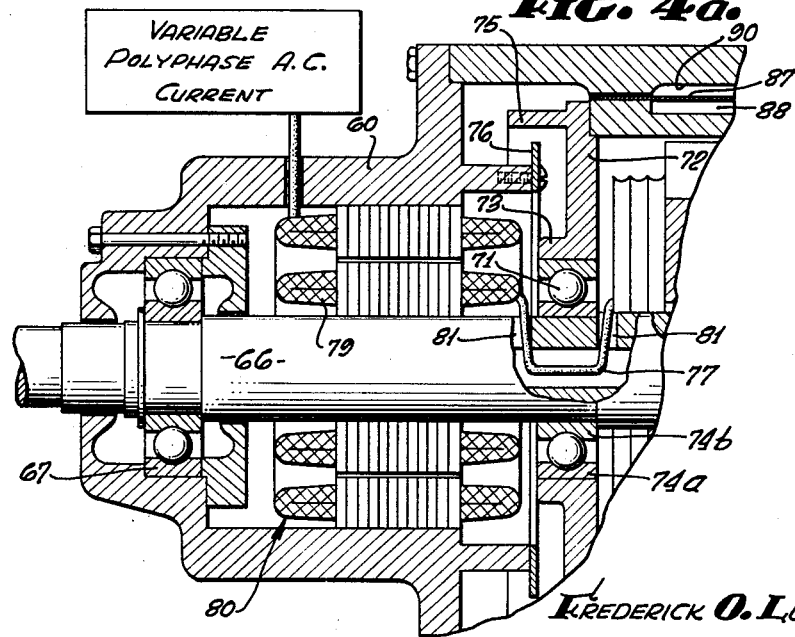
FIG. 4a is a fragmentary axial sectional view of still another form of the present invention.

In the forms of FIGS. 4 and 4a, a slightly different arrangement is provided for cooling the clutch. The periphery of the drum 69 has a shallow recess 86 that extends broadly over the area of the drum and is defined by relatively raised rims at the ends of the drum. A sleeve 87 telescopes over the drum 69 and defines with the recess 86 an annular chamber or water jacket 88, the walls of which rotate with the drum 69. In the present instance, the exterior surface of the inductor drum 69 may be cooled by the water jacket 88 that creates no drag between relatively rotating parts for the reason that the water jacket itself rotates with the inductor drum 69.

However, water or coolant must be injected and removed from the drum. To inject cooling water into the annular space 88, a fitting 89 is provided that is attached to the end bracket 61. The fitting 89 projects beneath a splash guard 90 and a flange 91 of the inductor drum to which the splash guard is affixed. The end of the fitting is capable of registry with a series of circularly arrayed inlet ports 92 of the drum and located at the right hand end of the annular space 88.

At the left hand end of the space 88 are outlet apertures 93 arrayed circularly and opening into an interior annular recess 94 of the housing 62. A discharge conduit 95 is attached to the housing.

Water entering the inlet ports 92 at the right hand end of the space 88 ultimately exits via the openings 93 at the other end in the shell 87.

At low or light loads, a small amount of water can be sent through the space 88. Efficiency of the clutch yet remains high by virtue of the fact that water creates little frictional drag. At higher loads, more water can be sent into the space 88 for cooling purposes; and in addition, by the aid of ports 96 in the base of the drum 69, it is possible to divert some of the incoming water to the drum interior. The water entering the port 96 ultimately exits via ports 97 at the outer end of the cup and which communicate with the exterior of the inductor drum 69 and thus to the outlet conduit 96 via apertures 93.

The inventor claims:

1. In an eddy current clutch: an input shaft; an output shaft; means supporting the shafts for independent rotation; an eddy current member carried by one of the shafts; a field structure having a winding and carried by the other of the shafts for inducing eddy currents in the eddy current member to establish a coupling between the shafts; a generator having a rotor structure carried by said other shaft and a stator structure cooperable with an electrical power source; said rotor structure having a winding connected to the winding of said field structure; said stator structure including means for creating field that rotates faster than the rated speed of the clutch, rotation of the said other shaft reducing the speed of the stator field with respect to the rotor.

2. In an eddy current clutch: an input shaft; an output shaft; means supporting the shafts for independent rotation; an eddy current member carried by one of the shafts; a field structure having a winding and carried by the other of the shafts for inducing eddy currents in the eddy current member to establish a coupling between the shafts; a generator having a rotor structure carried by said other shaft and a stator structure cooperable with an electrical power source; said rotor structure having a winding connected to the winding of said field structure; said stator structure including means for creating a rotating field, rotation of said other shaft increasing the speed of the stator field with respect to the rotor.

References Cited by the Examiner

UNITED STATES PATENTS

| | | | |
|---|---|---|---|
| 2,271,087 | 1/42 | Maier | 310—96 |
| 2,367,163 | 1/45 | Winther | 310—93 |
| 2,838,702 | 6/58 | Winther | 310—105 |
| 2,864,015 | 12/58 | King | 310—93 |
| 2,965,777 | 12/60 | Jaeschke | 310—105 |
| 3,007,066 | 10/61 | Ponsy | 310—96 |
| 3,056,895 | 10/62 | Cohen | 310—96 |

FOREIGN PATENTS 210,097  1/24  Great Britain.

MILTON O. HIRSHFIELD, *Primary Examiner.*

DAVID X. SLINEY, *Examiner.*